United States Patent [19]
Hancock

[11] Patent Number: 5,564,366
[45] Date of Patent: Oct. 15, 1996

[54] LITTER BOX SYSTEM

[76] Inventor: Michael T. Hancock, 334½ E. 10th St., Azusa, Calif. 91702

[21] Appl. No.: 362,251

[22] Filed: Dec. 22, 1994

[51] Int. Cl.⁶ .................................................. A01K 1/035
[52] U.S. Cl. ............................................. 119/167; 119/165
[58] Field of Search .................................. 119/166, 167, 119/169, 168, 165

[56] References Cited

U.S. PATENT DOCUMENTS

| | | | |
|---|---|---|---|
| 1,942,287 | 1/1934 | Heitz | 119/169 |
| 3,386,417 | 6/1968 | Machowski | 119/169 |
| 3,688,741 | 9/1972 | Thompson et al. | 119/165 |
| 3,990,397 | 11/1976 | Lowe, Jr. | 119/165 |
| 4,308,825 | 1/1982 | Stepanian . | |
| 4,312,295 | 1/1982 | Harrington | 119/167 |
| 4,325,822 | 4/1982 | Miller . | |
| 4,615,300 | 10/1986 | McDonough . | |
| 4,648,349 | 3/1987 | Larson | 119/168 |
| 4,736,707 | 4/1988 | Christie | 119/165 |
| 4,766,845 | 8/1988 | Bavas | 119/165 |
| 4,771,731 | 9/1988 | Derx et al. | 119/166 |
| 4,846,105 | 7/1989 | Caldwell | 119/168 |
| 4,848,274 | 7/1989 | Yananton | 119/169 |
| 5,031,578 | 7/1991 | Hammons et al. . | |
| 5,158,042 | 10/1992 | Hammerslag et al. . | |

FOREIGN PATENT DOCUMENTS

| | | | |
|---|---|---|---|
| 2615356 | 11/1988 | France | 119/168 |

Primary Examiner—Todd E. Manahan
Attorney, Agent, or Firm—Boniard I. Brown

[57] ABSTRACT

A litter box system and method for containing and separating animal waste from litter includes a first box and a second box forming a container which houses the litter, a floor card, and a cover sheet for absorbing odors. The litter box system also includes an additional floor card for use during the cleaning process, which includes installation of the additional floor card, a clean cover sheet, and a filter bag. The litter box system is inverted, depositing the litter into the filter bag for filtering litter through apertures in the filter bag, while retaining animal waste within the filter bag for disposal. Each of the boxes is substantially identical having an opening for passage of animal waste into the litter box system. A flange surrounds the opening for helping to retain the litter within the litter box system during use by an animal. The cover sheet may be coated with a protective material, such as wax, for substantially preventing the passage of liquid animal waste therethrough. Handles attached to the first and second boxes, floor cards, and filter bag enable a person to grasp the handles for manipulation of the boxes, floor cards, and filter bag. An alternative embodiment of the litter box system, which utilizes a plurality of cover sheets or a plurality of cover sheets and filter bags positioned alternately together within one of the boxes, does not need to be inverted to remove the soiled cover sheets.

10 Claims, 4 Drawing Sheets

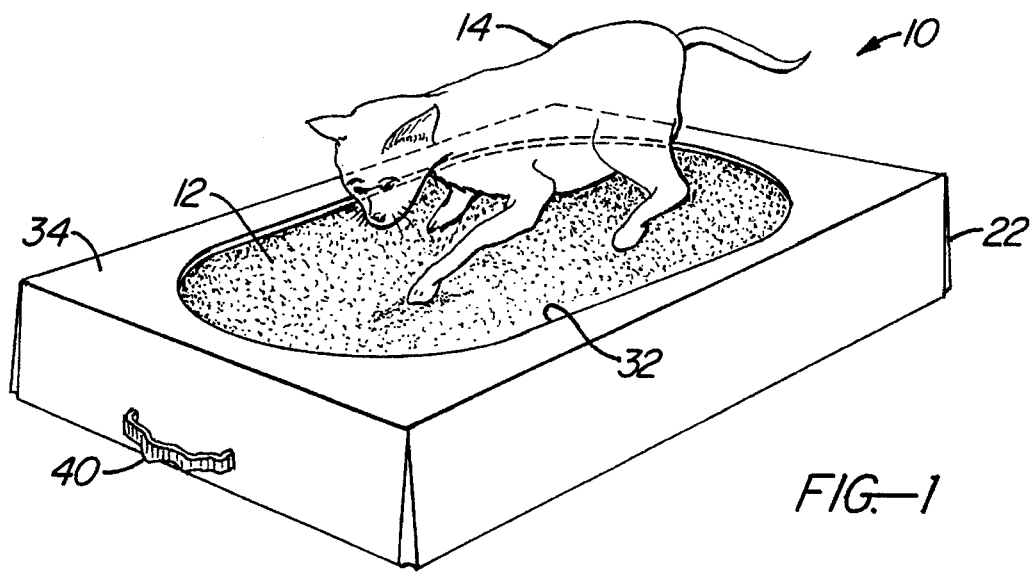
FIG.—1
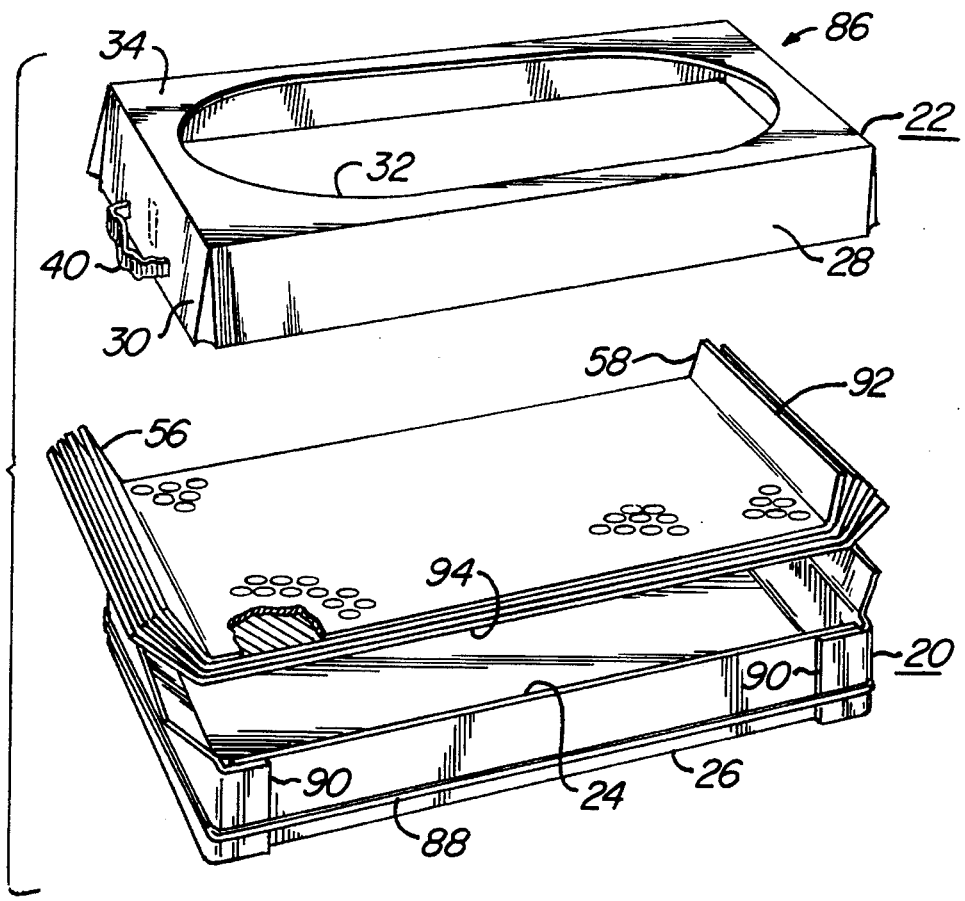
FIG.—7

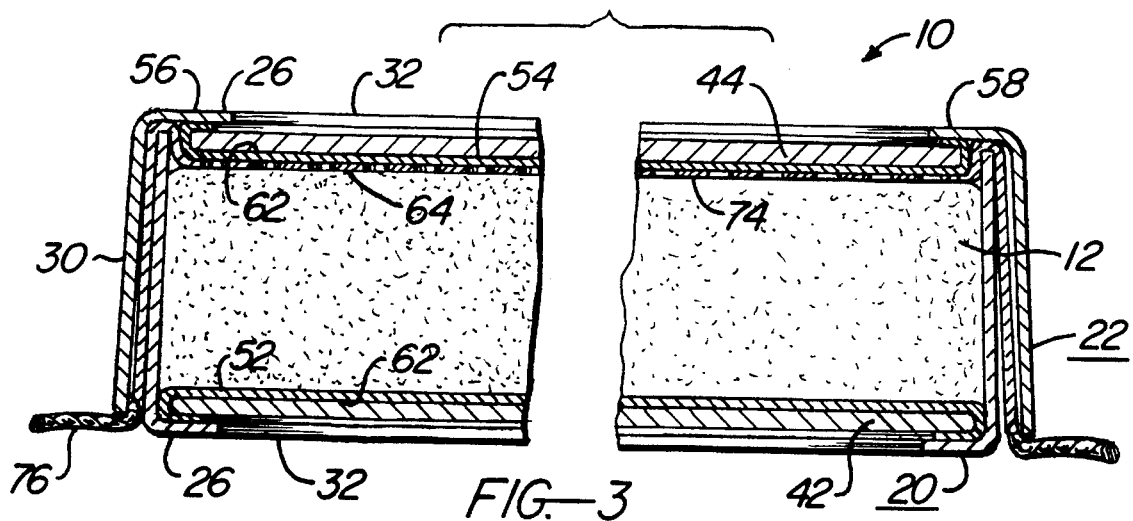
FIG.—3
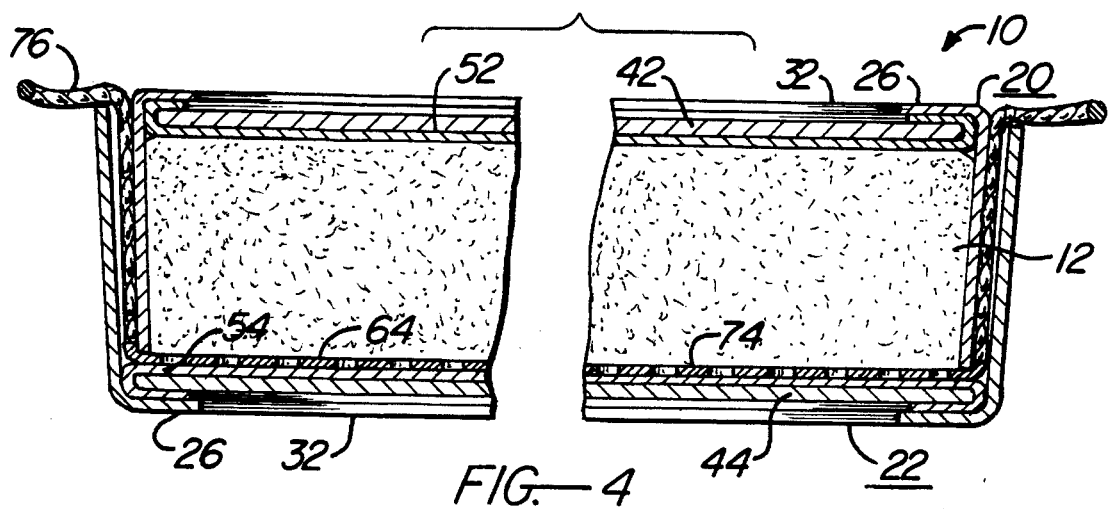
FIG.—4
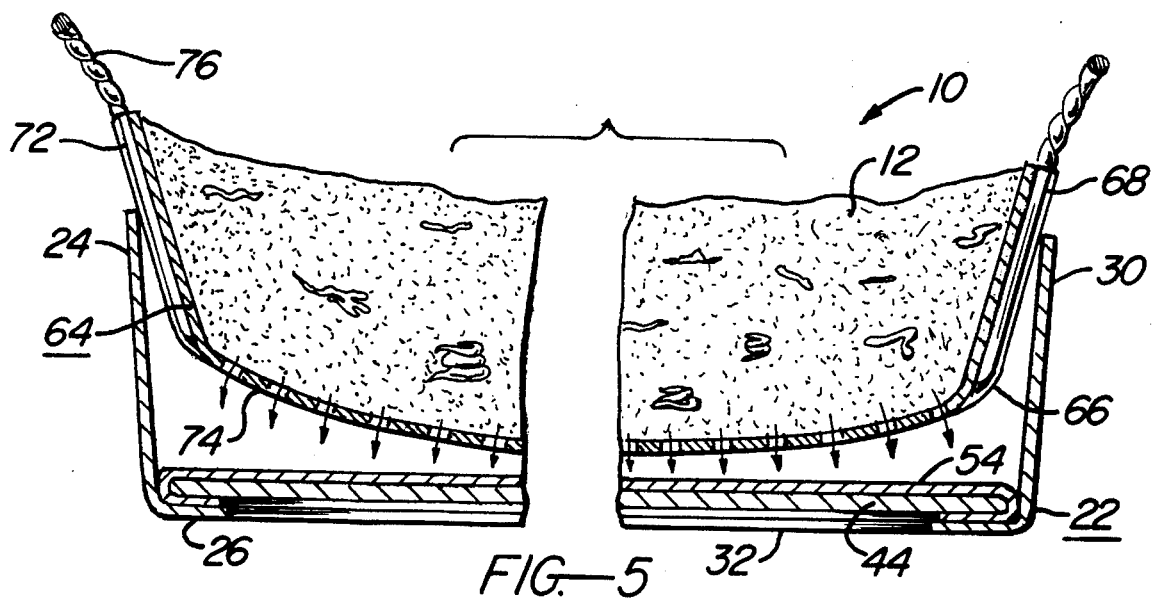
FIG.—5

FIG.—6
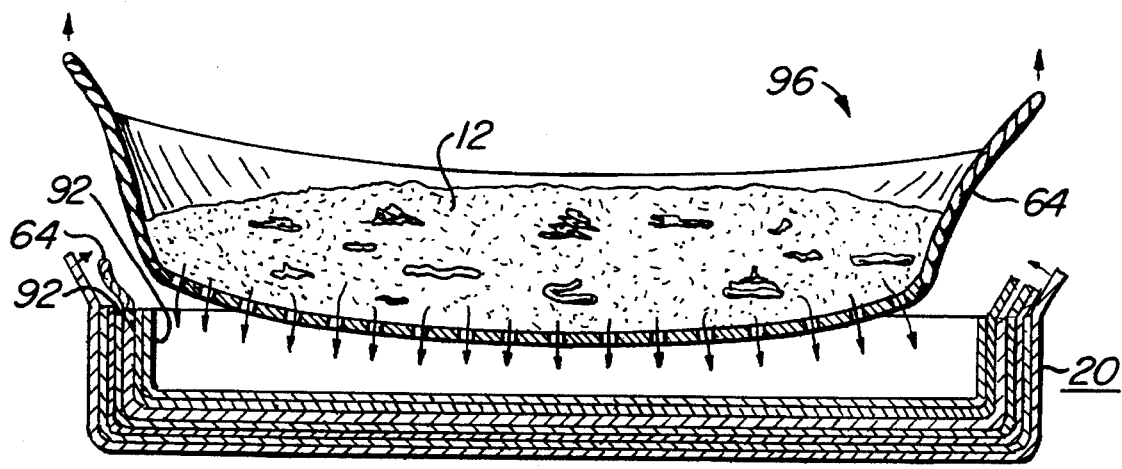
FIG.—8

LITTER BOX SYSTEM

BACKGROUND OF THE INVENTION

The invention relates to litter boxes and, more particularly, to a litter box system having an absorbent sheet and filtering system for separating animal waste, both liquid and solid from the litter.

Litter boxes are commonly used to contain a granular material, such as litter, for absorbing and deodorizing animal waste, such as the solid and liquid waste of a household cat. Cleaning of the litter box can be an unpleasant task for the pet's owner. Either the entire contents of the litter box can be disposed of, which requires new litter to be replaced in the litter box and increases the expense to care for the pet, or the contents of the litter box may be sifted through, such as with a scoop, to separate the animal waste from the re-usable litter.

A litter box is disclosed in U.S. Pat. No. 4,615,300 issued Oct. 7, 1986 to McDonough and entitled "Litter Box Liner". A liner is positioned within the litter box and is filled with litter. The liner has a bottom wall with a plurality of openings which are large enough to pass litter through but small enough to block animal excrement. The liner also includes an imperforate flap, including a deodorizing agent, attached beneath the bottom wall. To separate the waste from the litter, the liner is pulled upward allowing the litter to pass through the openings as the flap drops down. However, after removal of the liner, the flap containing the pet's urine is positioned outside of the liner, possibly contacting the pet's owner during the cleaning process. Also, the pet may claw at the liner, possibly altering the positioning of the liner, and may puncture the liner and flap, decreasing the effectiveness of the litter box. The liquid waste in combination with the litter may form clumps, reducing the filtering ability of the liner and causing the flap to stick to the liner, preventing the flap from dropping to filter the litter.

U.S. Pat. No. 5,031,578 issued Jul. 16, 1991 to Hammons et al. and entitled "Pet Litter Box System Which Prevents the Development of Unpleasant Odors" discloses a litter box system having a plurality of filtering members and protective members including liquid sorbent means. However, as discussed hereinabove, the liquid waste in combination with the litter may form clumps and stick to the filtering member, reducing the filtering ability of the litter box system.

Another litter box is disclosed in U.S. Pat. No. 4,325,822 issued Apr. 20, 1982 to Miller and entitled "Pet Litter Separator". The litter box includes a pair of receptacles and a screen member. After an animal deposits waste into one of the receptacles, the screen member is positioned between the pair of receptacles, the receptacles are inverted, filtering the litter into one of the receptacles, while retaining the animal waste in the other receptacle. However, the litter box does not provide for reducing the odor due to the animal's liquid waste, which is often deposited on the bottom of the litter box.

Therefore, what is needed is an apparatus and method for disposal of animal waste which utilizes a container including an absorbent member and a filtering member for easily and sanitarily separating animal waste contained in the litter box.

SUMMARY OF THE INVENTION

A litter box system includes a first box having a closed end, an open end, and at least one wall extending therebetween. A second box is substantially identical to the first box having a closed end, an open end, and at least one wall extending therebetween. The first and second boxes are sized and adapted to be joined together for containment of animal waste and the closed end of at least one of the boxes has an opening therethrough for receiving animal waste. A cover sheet is disposed within at least one of the boxes and adjacent to the closed end for absorbing liquid animal waste. The litter box system further includes a filter bag, having a plurality of apertures, disposed within at least one of the boxes during cleaning of the litter box system. The filter bag and the apertures therein are adapted to retain the animal waste within the filter bag while filtering clean litter therethrough. The litter box system also includes a floor card disposed between the closed end of one of the first and second boxes and the cover sheet for covering the opening of the closed end. The first and second boxes may telescopically interfit together for containment of the animal waste.

A method for disposal of animal waste utilizing the litter box system includes the steps of disposing one of the boxes, such as the first box, on a supporting surface for service having the open end of the first box facing upwardly and the closed end of the first box positioned adjacent to the supporting surface. At least one cover sheet is disposed within the first box. The litter is placed onto the cover sheet within the first box. A second box, having an opening therethrough for receiving animal waste, is interfitted together with the first box.

A method for disposal of the animal waste includes the steps of removing the second box from the first box and positioning the filter bag, having an open end confronting the litter, over the first box after animal waste has been deposited into the litter. A second cover sheet is positioned adjacent to a second floor card and to the filter bag, having the cover sheet positioned between the filter bag and the floor card. The second box and the first box are positioned slidably together until the second box contacts the second floor card. Inverting the boxes and disposing the second box on the supporting surface, causes the litter to fall into the filter bag. The first box is removed from the second box. The first floor card is removed, allowing the first cover sheet to fall into the filter bag, onto the litter. The filter bag is removed from the second box to filter clean particles of the litter through apertures in the filter bag and onto the second cover sheet, while retaining animal waste within the filter bag. The first box is repositioned together with the second box for continued use of the litter box system.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

FIG. 1 is a schematic illustration of an animal positioned within a litter box system;

FIG. 3 is a sectional view of the litter box system having a second box positioned over a first box;

FIG. 4 is a sectional view of the litter box system of FIG. 3 in an inverted position;

FIG. 5 is a sectional view of a filter bag being removed from the second box and filtering litter through apertures in the filter bag;

FIG. 6 is a sectional view of a cover sheet pad having tabs positioned within the litter box system;

FIG. 7 is an exploded view of an alternative embodiment of the litter box system of FIG. 2: and FIG. 8 is a sectional view of another alternative embodiment of the litter box system of FIG. 2.

DESCRIPTION OF THE PREFERRED EMBODIMENT

Figure 2:
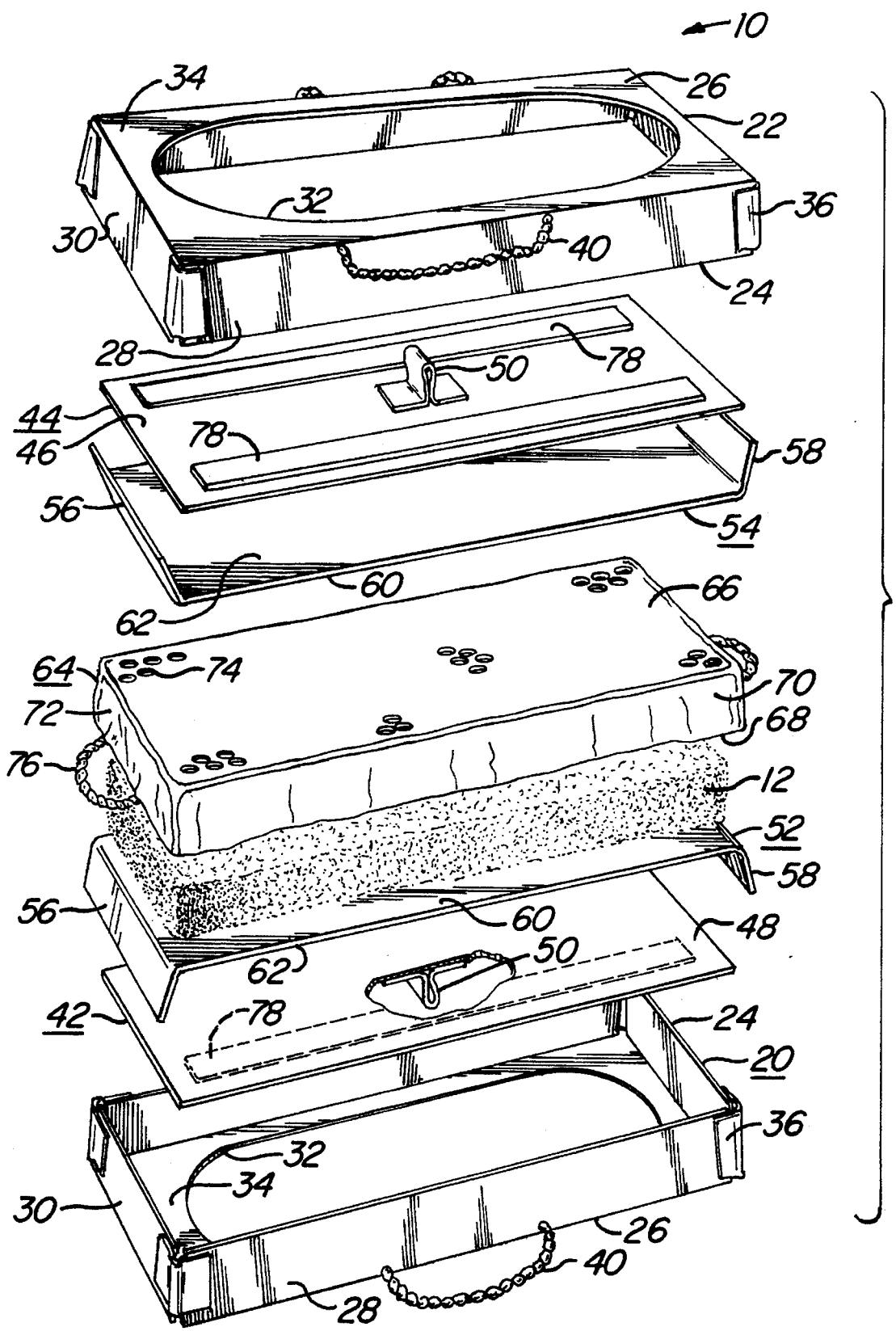
FIG. 2 is an exploded view of the litter box system.

The invention described herein provides an apparatus and method for disposal of animal waste.

Referring to FIG. 1, a litter box system 10 contains a granular material, such as a natural clay material mixed with sand, referred to as litter 12. An animal 14, such as a cat, may deposit waste into the litter box system 10.

Referring to FIG. 2, the litter box system 10 includes a pair of substantially identical boxes, referred to as a first box 20 and a second box 22, which interfit telescopically together for forming a container for housing the litter 12. The boxes 20 and 22 may be constructed of cardboard, plastic, or the like. Preferably, the boxes 20 and 22 are constructed of cardboard for efficient disposal of the boxes 20 and 22 after use. The boxes 20 and 22 may be rectangular, square, circular, or any shape suitable for containing the litter 12. Because the boxes 20 and 22 are mirror images of each other, the boxes 20 and 22 can be used as either the top or the bottom half of the container.

The first and second boxes 20 and 22 have an open end 24, a closed end 26, a pair of first walls 28, and a pair of second walls 30. The closed end 26 has an opening 32 therethrough for enabling the animal to stand inside of the opening 32 to deposit waste into the litter 12 contained within the litter box system 10. The closed end 26 has a flange 34, or flat portion extending horizontally inwardly about the opening 32, for retaining litter from being kicked out of the litter box system 10 by the animal 14 during the covering up process of the animal 14. The opening 32 may be oval, circular, rectangular, or the like for confining the animal towards the center of the litter 12 positioned within the litter box system 10, reducing the expulsion of litter 12 from the litter box system 10 by the animal.

The plurality of walls 28 and 30 extend upward and slightly outward from the closed end 26 and form the open end 24. The walls 28 and 30 are attached together by a flexible member 36, such as a piece of cloth or any other suitable material which expands and contracts. Utilization of the flexible member 36 enables the first box 20 to be slid either into or over the second box 22 and vice versa.

A handle 40 is attached to each of the first walls 28 adjacent to the closed end 26 for enabling a person to grasp the handles 40 to manipulate the boxes 20 and 22. For example, a person may grasp the handles 40 to remove the first box 20 from the second box 22. Alternatively, the handle 40 may be attached to the closed end 26 or side walls 30 of the boxes 20 and 22. Use of the handles 40 reduces the possibility of the person contacting the animal waste.

The litter box system 10 includes a pair of floor cards, referred to as a first floor card 42 and a second floor card 44. The floor cards 42 and 44 may be constructed of a sheet of cardboard or the like. The floor cards 42 and 44 are sized to be substantially the same dimensions as the closed end 26 of the boxes 20 and 22 for enabling positioning of the floor cards 42 and 44 adjacent the opening 32 within the container. As an example, the floor cards 42 and 44 may be sized to be ¼ inch less in length and width as compared to the length and width of the closed end 26.

The floor cards 42 and 44 have a first side 46 and a second side 48. A handle 50 is attached to the first side 46 of each of the floor cards 42 and 44 for providing a means for manipulating the floor cards 42 and 44. The handle 50 may be constructed of paper, cloth, or any suitable material which may be compressed for allowing the floor cards 42 and 44 to rest substantially flush with the ground surface that the litter box system 10 is positioned on during use of the litter box system 10 by the animal.

The litter box system 10 includes a plurality of cover sheets, such as a first cover sheet 52 and a second cover sheet 54. The cover sheets 52 and 54 may be constructed of a sheet of chipboard or any suitable material which absorbs animal liquid waste. The cover sheets 52 and 54 have a first flap 56, a second flap 58, and a surface 60 therebetween. The cover sheets 52 and 54 are sized to have substantially the same width as the floor card 42 or 44 and to have a portion which extends beyond the length of each end of the floor card 42 or 44. The extended portion on one end of the cover sheet 52 or 54 produces the first flap 56 and an extended portion on an opposite end of the cover sheet 52 or 54 produces the second flap 58.

Between the flaps 56 and 58 and the surface 60 is a bendable portion for enabling the flaps 56 and 58 to be bent. Preferably, the flaps may be bent from approximately 0° to 180°. As an example of the dimensions of the cover sheets 52 and 54, the cover sheets 52 and 54 may extend approximately 6 inches beyond the length of the floor card 42 or 44 producing a first flap 56 which extends approximately 3 inches beyond one end of the floor card 42 or 44 and producing a second flap 58 which extends approximately 3 inches beyond an opposite end of the floor card 42 or 44.

The first and second flaps 56 and 58 bend toward the same side of the surface 60, such as a side 62, for at least partially wrapping the cover sheets 52 and 54 around the floor cards 42 and 44. The side 62 may be coated with a wax or any suitable protective material for preventing the passage of liquid waste therethrough.

The litter box system 10 includes a filter bag 64 having a closed end 66, an open end 68, a pair of first side walls 70, and a pair of second side walls 72. The closed end 66 has a plurality of apertures 74 sized to allow passage of re-usable litter therethrough, while preventing the passage of animal waste and litter contaminated with animal waste. The filter bag 64 is sized to fit within the boxes 20 and 22, preferably, having substantially the same shape and dimensions as the boxes 20 and 22. As illustrated in FIG. 2, the filter bag 64 is rectangular in shape and the four side walls 72 and 74 extend upward and slightly outward, forming the open end 68.

A handle 76 is attached to each of the second side walls 72 and protrudes beyond the open end 68 for enabling a person to grasp the handles 76 for removing the filter bag 64 from the litter box system 10. The handles 76 may be constructed of paper, cloth, or the like.

A gasket 78 may be positioned along each edge of the floor card 42 and 44 which is not enclosed by the flaps 56 and 58 of the cover sheet 52 or 54. The gasket 78 may be constructed of paper or the like and is sized to protrude beyond the edge of the floor card 42, for example, by ⅛ of an inch.

For the various embodiments of this invention, the same reference characters will be used to designate like parts. In addition, like functions and like interactions of the parts among the various embodiments of this invention will not be repeated for each embodiment.

Referring to FIG. 6, as an alternative to the use of a single cover sheet 52 or 54, a plurality of cover sheets 52 or 54 may be attached to one another in a stack, referred to as a cover sheet pad 82. The cover sheets 52 or 54 in the cover sheet pad 82 may be attached by placing a padding compound or any suitable adhesive material between adjacent layers of cover sheets. Alternatively, the cover sheets 52 or 54 may be attached together by mechanical means, such as by stapling or clamping, or by any suitable means for attaching ends of the cover sheets 52 or 54 together.

Use of the cover sheet pad 82 allows a person to remove one cover sheet 52 or 54 from the pad 82 at a time. A tab 84 may be attached to each cover sheet 52 or 54, such as underneath the cover sheet 52 or 54, for providing a means for removal of the cover sheet 52 or 54 from the pad 82. The cover sheet pad 82 is sized having substantially the same dimensions as the floor card 42 or 44 and may be attached to the second side 48 of the floor card 42 or 44, such as by using any adhesive.

Referring to FIG. 7 and using the same reference characters to define like parts, an alternative embodiment of the litter box system 10 as illustrated in FIGS. 2–5 may be a litter box system 86 having like parts as litter box system 10 and having a drawstring 88 as the flexible member 36 for providing a means for holding the walls 28 and 30 of at least one of the boxes 20 and 22 together, for example, the first box 20. The drawstring 88 may be constructed of a flexible material, such as paper, cloth, or the like.

The box 20 may include flaps 90 extending from at least one side of walls 28 and 30 for providing a means for enclosing any gaps between the walls 28 and 30 of the box 20, when the drawstring 88 is utilized.

An alternative embodiment of the cover sheet 52 or 54 is a cover sheet 92. The cover sheet 92 is sized substantially similar to the cover sheets 52 and 54, but has a second side 94 which is coated with wax, as compared to cover sheets 52 and 54 which have side 62 coated with wax.

The cover sheet 92 is positioned within the first box 20 having the second side 94 positioned adjacent to the floor card 42 or 44 and having the flaps 56 and 58 extending substantially upward.

A plurality of cover sheets 92 may be stacked within the first box 20. Periodically, to clean the litter box system 86, one of the cover sheets 92 is pulled up through the litter 12 for disposal. The solid waste of the animal may be removed by a scoop.

Alternatively, the cover sheets 92 may be attached together, such as cover sheet pad 82, and affixed to the closed end 26 of the box 20. The flaps 56 and 58 may be attached to the walls 28 and 30 of the box 20. Alternatively, the cover sheet 92 or cover sheet pad 82 may be attached to the floor card 42 or 44.

The second box 22 may be positioned on the first box 20 for providing additional containment of the litter and animal waste. The litter box system 86 provides a system that does not need to be flipped or rotated to remove the soiled cover sheet 52 and 54.

Referring to FIG. 8 and using the same reference characters to define like parts, another alternative embodiment of the litter box system 10 as illustrated in FIG. 2 may be a litter box system 96 having like parts as litter box system 10 and having a plurality of cover sheets 92 and filter bags 64 stacked alternately together and positioned within one of the boxes 20 and 22.

Use of the filter bag 64 within the box eliminates the need to remove the animal waste with a scoop. Utilization of the cover sheet 92 absorbs animal liquid waste and odor. The litter box system 96 provides a system that does not need to be flipped or rotated to remove the soiled cover sheet 52, 54, or 92.

OPERATION

Referring again to FIG. 2, to assemble the litter box system 10, one of the boxes, such as the first box 20, is positioned on the ground having the closed end 26 positioned adjacent to the ground and the open end 24 facing away from the ground. In this position, the flexible member 36 is contracted.

One of the floor cards, such as the first floor card 42, is positioned adjacent to one of the cover sheets, such as the first cover sheet 52. The first and second flaps 56 and 58 of the first cover sheet 52 are bent around the first floor card 42 in a manner so that the waxed side of the first cover sheet 52 contacts the first floor card 42 and so that the handle 50 of the first floor card 42 is positioned on one side of the first floor card 42 and the first cover sheet 52 is positioned on an opposite side of the first floor card 42.

The first floor card 42 and cover sheet 52 assembly, including the gasket 78, is placed within the first box 20, covering the opening 32. The first floor card 42 is positioned adjacent to the closed end 26 and the handle 50 contacts the ground.

The litter 12 is positioned within the litter box system 10 on top of the first cover sheet 52, locking the flaps 56 and 58 of the first cover sheet 52 underneath the first floor card 42. The second box 22 is positioned so that the closed end 26 faces upward, expanding the flexible member 36 and allowing the second box 22 to be slid over and onto the first box 20. The first and second boxes 20 and 22 positioned together form the container into which an animal may deposit waste through the opening 32 of the second box 22 onto the litter 12.

To clean the litter box system 10, which includes separation of the waste from the re-usable litter, a person may grasp the handles 40 of the second box 22 and lift upward on the handles 40 to remove the second box 22 from the first box 20. A filter bag 64 is placed over the first box 20 and adjacent to the litter 12, having the open end 68 of the filter bag 64 facing downward and the side walls 70 and 72 of the filter bag 64 unfolded.

The second cover sheet 54 is placed on the filter bag 64 having the non-waxed surface 60 positioned adjacent to the filter bag 64. The first and second flaps 56 and 58 extend substantially upward, away from the filter bag 64.

The second floor card 44 is placed adjacent to the second cover sheet 54 having the second side 48 of the second floor card 44 positioned adjacent to the side 62 of the second cover sheet 54 and the first and second flaps 56 and 58 folded around the second floor card 44. The gasket 78 is positioned between the second floor card 44 and the second cover sheet 54.

As illustrated in FIG. 3, the second box 22 is repositioned on the first box 20 by sliding the second box 22 over the first box 20 until the closed end 26 contacts the second floor card 44. The handle 50 of the second floor card 44 extends through the opening 32 in the closed end 26 of the second box 22.

Grasping the container, such as the walls 28 and 30 and the closed end 26 of the boxes 20 and 22, tip the container onto one of its first walls 28. Continuing in the same direction, tip the container over until the closed end 26 of the second box 22 rests on the ground. In this position, the closed end 26 of the first box 20 faces upward, as illustrated in FIG. 4.

Tilting the litter box system 10 slightly will level the litter 12 within the boxes 20 and 22. The rotation or tipping of the container has caused the litter 12 to fill the filter bag 64, which is now positioned having the open end 68 facing upward. The weight of the litter 12 is now on top of a new cover sheet, such as the second cover sheet 54, and has locked the first and second flaps 56 and 58 of the second cover sheet 54 under the second floor card 44.

The first box 20 is removed from the second box 22 by grasping the handles 40 of the first box 20 and lifting upward. The removal of the first box 20 releases the first floor card 42 and soiled first cover sheet 52, which falls into the filter bag 64.

The flaps 56 and 58 of the first cover sheet 52 are unfolded from the first floor card 42. The first floor card 42 may be grasped by the handle 50 and removed from the filter bag 64. The first cover sheet 52 may remain in the filter bag 64 for disposal of the soiled cover sheet 52 along with the animal waste. Also, the first cover sheet 52 positioned with the filter bag 64 acts as a dust shield.

If the cover sheet pad 82 is used, the soiled cover sheet may be removed by grasping the handle 50 of the first floor card 42 and pulling the first floor card 42 and the attached cover sheet pad 82 from the filter bag 64. By using the tab 84, the soiled cover sheet is removed from the remainder of the cover sheet pad 82, exposing a fresh cover sheet. The soiled cover sheet may be placed within the filter bag 64 for disposal.

Referring to FIG. 5, the filter bag 64 is removed from the second box 22 by grasping the handles 76 of the filter bag 64 and lifting slowly upward. As the filter bag 64 is lifted, the litter 12 filters through the apertures 74 of the filter bag 64 onto the second cover sheet 54 which remains positioned within the second box 22. The filtering process also aerates the litter 12, which aids evaporation of moisture, retarding bacterial growth and odor. After the litter 12 has passed through the filter bag 64, the filter bag 64 containing the animal solid waste and soiled first cover sheet 52 is thrown away.

The re-usable litter 12 is now positioned within the second box 22 on top of the second floor card 44 and the second cover sheet 54. The first box 20 is positioned on the second box 22 and the litter box system 10 can be used again by the animal for deposit of the animal's waste. The process can be repeated for continued use of the litter box system 10.

Referring to FIG. 7, in addition to functioning similarly to the litter box system 10 illustrated in FIG. 2, the litter box system 86 may be used without flipping the container. The soiled cover sheet 92 may be grasped by either the flaps 56 and/or 58 or the tab 84 and pulled from beneath the litter 12.

Referring to FIG. 8, in addition to functioning similarly to the litter box system 10 illustrated in FIG. 2 and the litter box system 86 illustrated in FIG. 7, during assembly of the litter box system 96, the litter 12 may be positioned on the cover sheet 92. To clean and remove the animal waste, the cover sheet 92 may be grasped and pulled from beneath the litter 12. The filter bag 64 is lifted from the box 20 to filter clean litter through the apertures 74 of the filter bag 64 onto a new cover sheet 92.

An advantage of the litter box system 10, 86, and 96 is that the odor associated with litter boxes is reduced by providing a means for removing the bottom of the litter box, such as the cover sheets 52, 54, and 92, which accumulate the liquid waste of the animal. The liquid waste of the animal generally is at the bottom of the litter box due to either the animal digging through the litter 12 to the bottom of the box to deposit the waste or through gravity. The design of the cover sheet 52 or 54 locks the flaps under the floor card preventing the animal from clawing the cover sheet free when the animal digs in the litter.

The easy removal of the odor-causing agents reduces the length of contact of the waste with the litter 12, resulting in less absorbed odor into the litter 12 and an extended useful life of the litter 12. Use of the filter bag 64 also aerates the litter, aiding in evaporation of moisture, retarding bacterial growth.

The design of the opening 32, preferably an oval opening in a rectangular box, confines the animal to a center of the litter 12, and in combination with the walls 28 and 30 and flexible member 36 of the box 20 or 22, aids is reducing the expulsion of litter 12 by the animal from the litter box system 10, 86, or 96. The flange 34 also maintains the animal's waste spaced a distance from the side walls 28 and 30 of the box 20 or 22. The closed design of the liter box system 10 enables a person to turn the litter box system 10 over for servicing without lifting the full weight of the litter 12. The substantially identical design of the first box 20 and the second box 22 allows for usage of both halves of the container.

The litter box system 10 and 96 eliminates the unpleasant task of poking and prodding for the removal of waste material. The contaminated scooper storage problem is also eliminated.

The litter box system is a self contained system, providing a convenient package which may be used efficiently at home or on a trip. The recycling litter box system may be entirely closed when not in use.

After a prescribed user life of the litter box system, the litter box system should be thrown away. There is no need to wash out the litter box system, saving time, water, detergents, and cleaning agents. The first and second boxes 20 and 22 flatten, occupying a minimal amount of space in the trash or landfill. The litter box system may be made of 100% natural material or recycled paper which are biodegradable.

Therefore, the invention provides a litter box system and method for containing animal waste, separating the animal waste from the re-usable litter, and recycling the litter within the litter box.

I claim:

1. A litter box system for containment and separation of litter and animal waste, comprising:

a first box having a closed end with an opening, an open end, and a plurality of walls extending therebetween;

a second box having a closed end with an opening, an open end, and a plurality of walls extending therebetween, said first box and said second box being sized and adapted to be fit together for containment of said litter and animal waste;

litter disposed within at least one of said first and second boxes for deodorizing said animal waste;

a first floor card disposed within one of said first and second boxes and covering said opening of said closed end;

at least one cover sheet disposed within one of said first and second boxes between said first floor card and said litter for absorbing liquid animal waste; and a filter bag, having a plurality of apertures, positioned within at least one of said first and second boxes, during cleaning of said litter box system, said apertures sized to filter substantially clean litter therethrough while retaining contaminated litter and animal waste within said filter bag.

2. The litter box system according to claim 1, further comprising:

a second floor card disposed within the other of said first and second boxes and covering said opening of said closed end; and a second cover sheet disposed within the other of said first and second boxes between said closed end and said second floor card for providing a clean cover sheet within said litter box system.

3. The litter box system according to claim 1, wherein said floor card has at least one handle for enabling a person to grasp said handle for manipulation of said floor card.

4. The litter box system according to claim 1, wherein said cover sheet has a side including a protective material for substantially preventing flow of liquid therethrough.

5. The litter box system according to claim 1, wherein said filter bag has at least one handle attached to said filter bag for enabling a person to grasp said handle for manipulation of said filter bag.

6. A method for disposal of animal waste, comprising the steps of:

providing a litter box system including a first box, a second box, a first cover sheet and first floor card positioned within said first box, and litter disposed on said first cover sheet;

removing said second box from said first box with said first box positioned on a supporting surface;

positioning a filter bag over said first box after deposition of animal waste onto said litter, with an open end of said filter bag confronting said litter;

positioning a second cover sheet adjacent to a second floor card;

positioning said second cover sheet and said second floor card adjacent to said filter bag with said second cover sheet between said filter bag and said second floor card;

interfitting together said second box and said first box having said second box contact said second floor card;

inverting said boxes and disposing said second box on the supporting surface, allowing said litter to fall into said filter bag;

separating said first and second boxes;

removing said first floor card while allowing said first cover sheet to fall into said filter bag and onto said litter;

removing said filter bag from said second box to filter clean litter through apertures in said filter bag and onto said second cover sheet, while retaining animal waste in said filter bag; and interfitting together said first box and said second box for continued operation of said litter box system.

7. The method according to claim 6, wherein the step of positioning said second cover sheet adjacent to said second floor card includes bending a first flap and a second flap of said second cover sheet around said second floor card, said flaps being locked into position under said second floor card by said litter positioned on said second cover sheet within said second box.

8. The method according to claim 6, wherein the steps of separating said first and said second boxes, and removing said first floor card and said filter bag include grasping a handle attached to said first and second boxes, said first floor card, and said filter bag.

9. The method according to claim 6, wherein the step of removing said first cover sheet includes grasping a tab and pulling one cover sheet from a cover sheet pad having a plurality of cover sheets attached together.

10. The method according to claim 6, wherein the step of positioning said second cover sheet adjacent said second floor card includes positioning a side of said second cover sheet including a protective material adjacent to said second floor card for substantially preventing flow of liquid therethrough.

* * * * *